March 5, 1957     E. FRANZ     2,783,514
FASTENER
Filed Jan. 4, 1955

INVENTOR.
EDWARD FRANZ
BY
HIS ATTORNEY

United States Patent Office 2,783,514
Patented Mar. 5, 1957

2,783,514

FASTENER

Edward Franz, Detroit, Mich., assignor to Robert L. Brown, Ferndale, Mich.

Application January 4, 1955, Serial No. 479,776

1 Claim. (Cl. 24—73)

This invention relates to a fastener and more particularly to a stamped sheet metal fastener for insertion in an opening for securing finishing objects, such as moldings, to a surface.

More specifically stated, the invention relates to improvements in that type of fastener disclosed in Waara Patent 2,460,722, issued February 1, 1949, for securing a molding or other decorative part to a supporting member through an aperture in the supporting member.

A primary object of the invention is to provide a bendable member with edge flanges which, when bent to locking position, causes the flanges to bite into the edge of the aperture in the support.

Another object of the invention is to provide locking projections on the edge flanges which engage the under surface of the supporting member to further lock the fastener to its support.

Other objects and advantages of the invention will more fully appear from the following description taken in connection with the accompanying drawings, in which.

Figure 1:
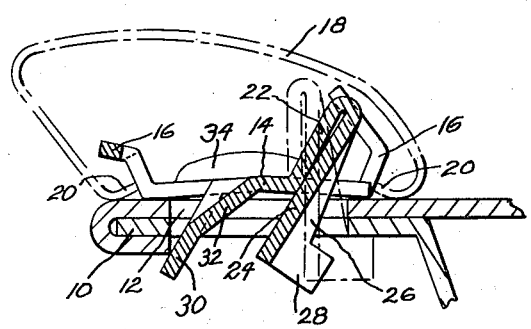
Fig. 1 is a cross sectional view, taken on line 1—1 of Fig. 2, through the fastener and its supporting member, the full lines indicating the position of the parts in the unlocked position and the locked position being shown by the dot and dash lines; the molding is also shown by dot and dash lines.
Figure 2:
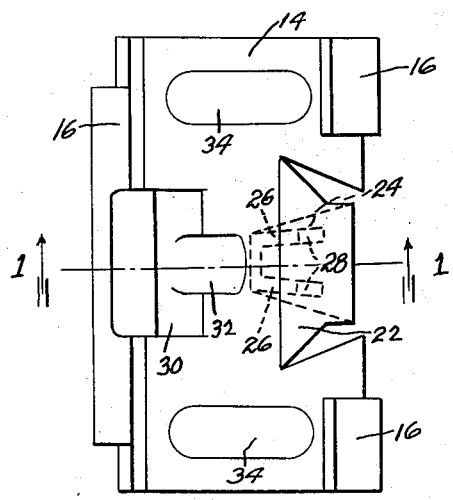
Fig. 2 is a top plan view of the fastener before it is bent to its locked position.
Figure 3:
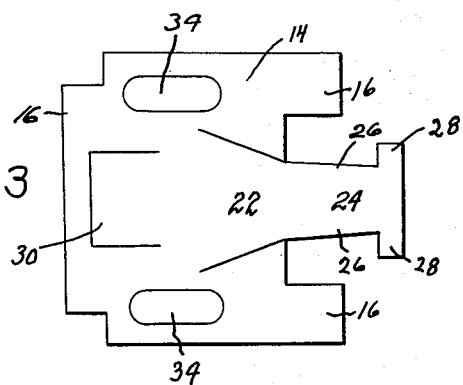
Fig. 3 is a top plan view illustrating the blank from which the fastener is formed.

Referring to the drawings, the fastener is first applied to a panel member 10 having an aperture 12 therethrough. The fastener comprises a body portion 14 with lateral upstanding flanges 16, sloping outwardly, to which a molding 18 is applied by snapping its spaced, inwardly extending, flanges 20 over the flanges 16.

The fastener is preferably made of malleable metal, such as cold roll steel, as distinguished from spring steel. An arm 22 is formed from out of the body portion 14 which is reversely bent back upon itself, as at 24. The two part fold of the arm 22 projects above the plane of the body portion 14 and the folded back portion 24 projects below the plane of the body portion 14. The folded back portion 24 is provided with lateral outstanding flanges 26 and at the free ends of the flanges 26, below the plane of the body portion 14, are outwardly extending projections 28. In the normal position of the two part fold arm 22, before the fastener is applied to its support, the arm extends at an acute angle to the body 14, as shown in full lines in Fig. 1.

Another arm 30, laterally spaced from the arm 22, is struck out of the body portion 14 and is bent downwardly below the plane of the body 14 and at an acute angle to the body forming a hook to engage the underside of the supporting panel 10 when it is inserted in the aperture 12. This arm 30 has a depressed rib 32 formed therein at its juncture to the body portion 14 to stiffen the arm against bending relative to the body portion 14. The body portion 14 may be provided with ribs 34 to stiffen the body portion against bending.

In the assembly of the device, the arm 30 and the downwardly extending portion 24 of arm 22 are inserted through the aperture 12 of the supporting member 10. This is freely done because of the angular relation of the arm 22 with respect to the body portion 14. The fastener is forced against the lower edge at one side of the aperture 12, and the arm 30 holds the base tightly to the supporting panel 10. The arm 22 is then bent to a position substantially normal to the plane of the body portion, whereupon the portion 24 of the arm, extending below the supporting panel, is moved to the opposite side of the aperture 12 in the panel 10 and the projection 28 engages the underside of the panel 10. Not only does the projection 28 hold the fastener to the panel but the spaced flanges 26 fit into the edge of the aperture to firmly hold the fastener against shifting and prevents rattle. With the fastener securely locked to the supporting panel against separation and shifting, the molding 18 is snapped over the upwardly and outwardly extending flanges 16, with the flanges 20 of the molding tightly gripping the tapered surfaces.

The device has been illustrated in a preferred form of the invention but it will be understood that various changes, including the size, shape and arrangement of parts, may be made without departing from the spirit of the invention. For example, the direction of the arms may be reversed. It is not my intention to limit its scope other than by the terms of the appended claim.

I claim:

A malleable sheet metal fastening device comprising a base, a downwardly extending stationary arm depending from said base at an acute angle thereto to provide a hook for locking engagement with one edge of an aperture in a panel member, a second arm reversely bent upon itself and to said base to extend above and below said base, said second arm being joined to said base by malleable means intermediate the ends of said arm initially extending to an acute angle to said base whereby it is adapted to be bent to project its lower portion in a direction to form a co-operating locking means with said first named arm at the opposite edge of the aperture in a panel member, said second arm being provided with an outward projection extending from the side of said second arm opposite said first arm at the extremity of its lower portion for engaging the under side of the panel, and outwardly projecting flanges at its opposite sides for biting into the edge of the aperture in the panel.

References Cited in the file of this patent

UNITED STATES PATENTS

| 2,428,338 | Poupitch | Sept. 30, 1947 |
| 2,476,207 | Brown | July 12, 1949 |
| 2,670,512 | Flora | Mar. 2, 1954 |